US008059655B2

(12) United States Patent
Younis et al.

(10) Patent No.: US 8,059,655 B2
(45) Date of Patent: Nov. 15, 2011

(54) UNIFIED INTERFACING FOR DVB-T/H MOBILE TV APPLICATIONS

(75) Inventors: Waleed Younis, Tustin, CA (US); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 812 days.

(21) Appl. No.: 11/615,305

(22) Filed: Dec. 27, 2006

(65) Prior Publication Data

US 2008/0159279 A1 Jul. 3, 2008

(51) Int. Cl.
*H04L 12/28* (2006.01)
*H04L 12/56* (2006.01)
*H03M 13/00* (2006.01)

(52) U.S. Cl. .................. 370/395.1; 370/389; 370/395.5; 370/546; 714/746; 714/752; 714/756; 714/784

(58) Field of Classification Search .................. 370/389, 370/395.1, 395.5, 546; 714/746, 752, 756, 714/784
See application file for complete search history.

(56) References Cited

U.S. PATENT DOCUMENTS

| | | | |
|---|---|---|---|
| 6,400,720 B1 | 6/2002 | Ovadia et al. | |
| 2002/0064189 A1* | 5/2002 | Coupe et al. | 370/537 |
| 2002/0097701 A1* | 7/2002 | Lupien et al. | 370/338 |
| 2003/0231649 A1* | 12/2003 | Awoseyi et al. | 370/463 |
| 2006/0048208 A1 | 3/2006 | Sibley et al. | |
| 2006/0128422 A1 | 6/2006 | Van Rooyen | |
| 2006/0136968 A1* | 6/2006 | Han et al. | 725/71 |
| 2006/0215648 A1* | 9/2006 | Jen | 370/389 |
| 2006/0282749 A1 | 12/2006 | Guo | |
| 2007/0198877 A1* | 8/2007 | Wahl et al. | 714/701 |
| 2007/0230460 A1* | 10/2007 | Jeong et al. | 370/389 |

FOREIGN PATENT DOCUMENTS

EP 1603263 12/2005

OTHER PUBLICATIONS

Enensys Technologies "ENENSYS poster—Find Your Way in DVB-H" Sep. 15, 2005.*

* cited by examiner

*Primary Examiner* — Dang Ton
*Assistant Examiner* — Robert M Morlan
(74) *Attorney, Agent, or Firm* — Rahman LLC

(57) ABSTRACT

Transmitting data in a digital video broadcasting for handheld (DVB-H) receiver comprises a transport stream (TS) demultiplexer adapted to extract internet protocol (IP) datagrams from TS data packets; a packet identifier (PID) filter adapted to extract the TS data packets based on the PIDs of the TS data packets; a Multi Protocol Encapsulation-Forward Error Correction (MPE-FEC) random access memory (RAM) unit operatively connected to the TS demultiplexer; a Reed-Solomon decoder operatively connected to the MPE-FEC RAM unit; an IP to TS encapsulator operatively connected to the MPE-FEC RAM unit; a TS multiplexer operatively connected to each of the PID filter and the IP to TS encapsulator, wherein the TS multiplexer is adapted to combine both DVB-Terrestrial (DVB-T) and DVB-H TS data packets into a single combined TS data packet; and a host interface operatively connected to the TS multiplexer.

20 Claims, 16 Drawing Sheets

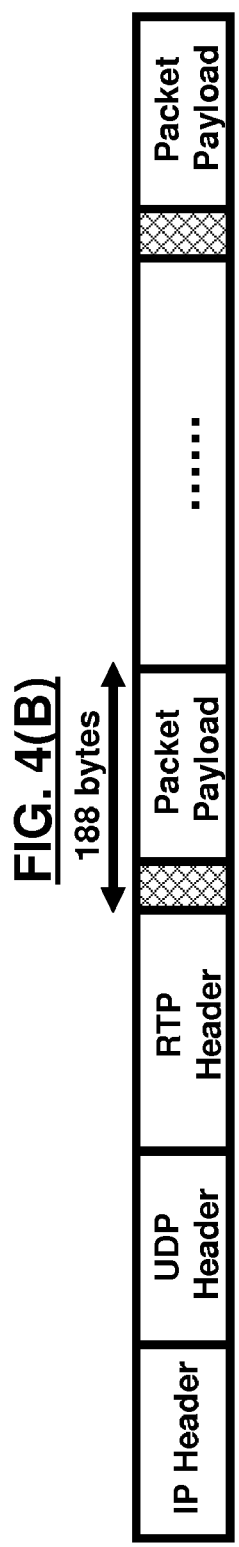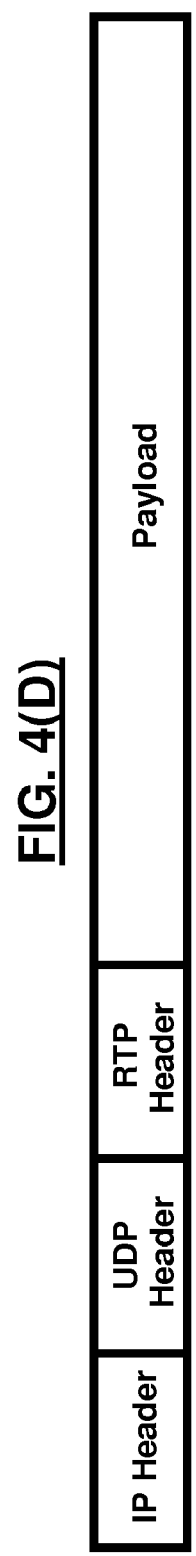

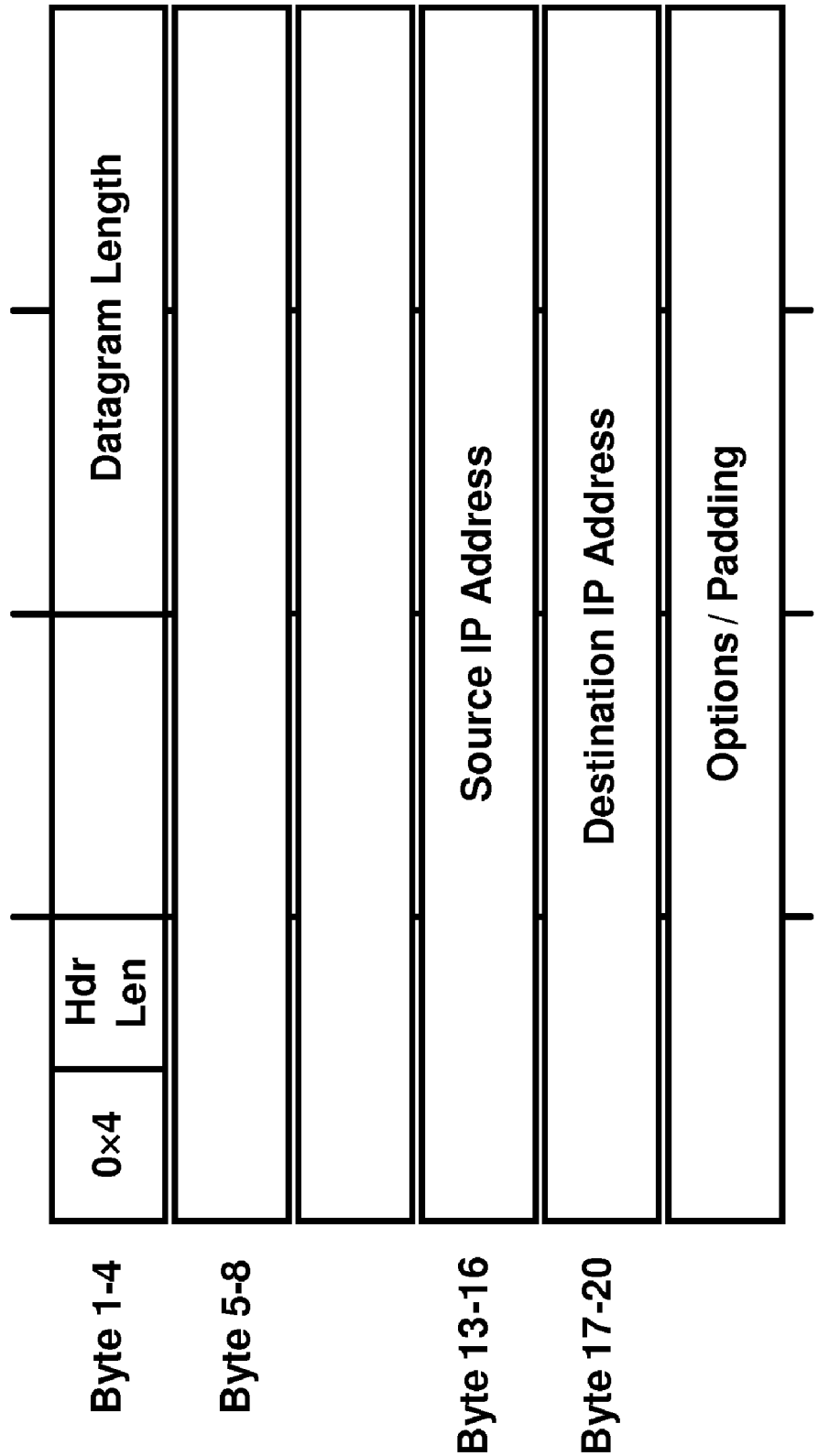

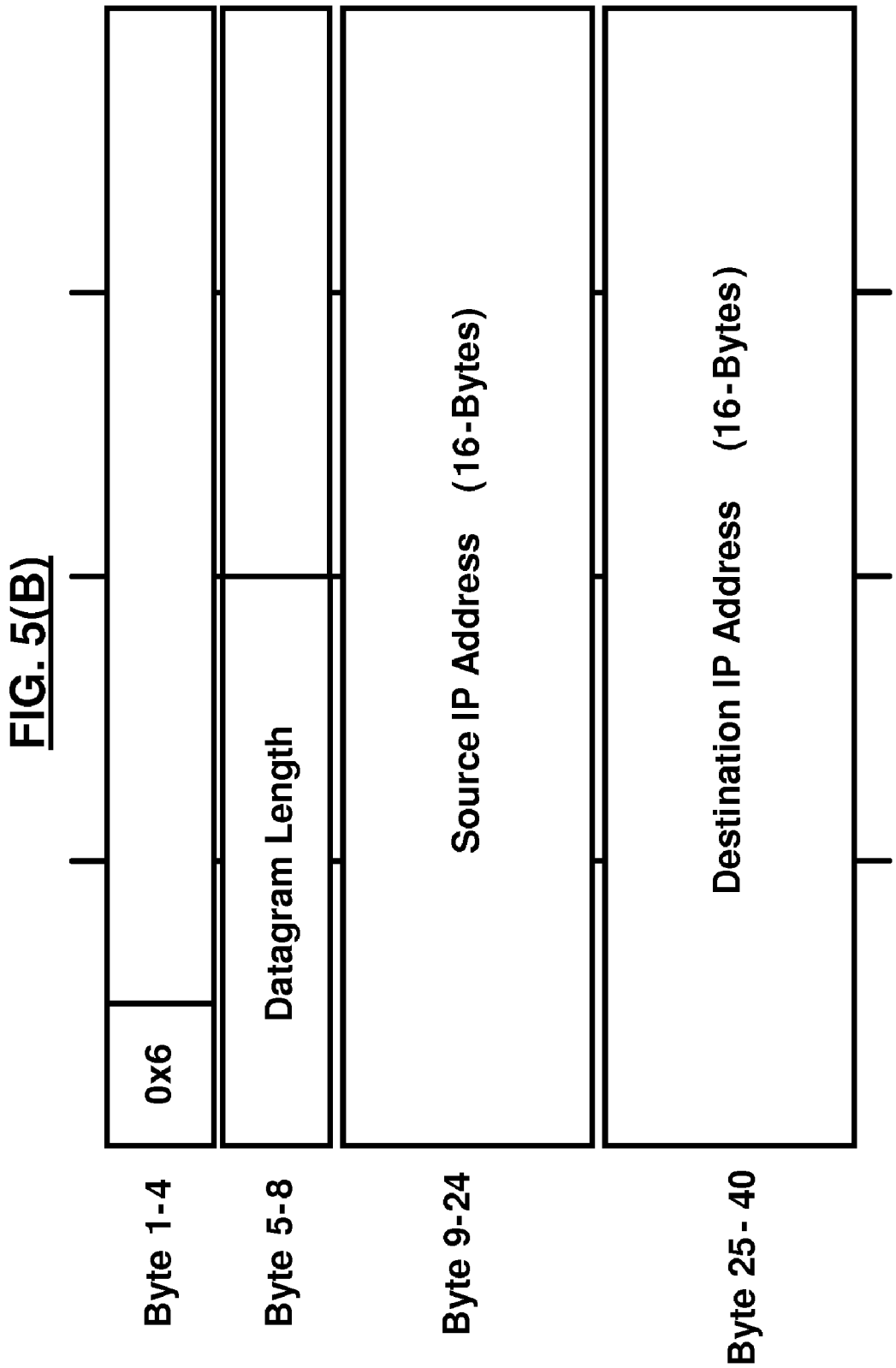

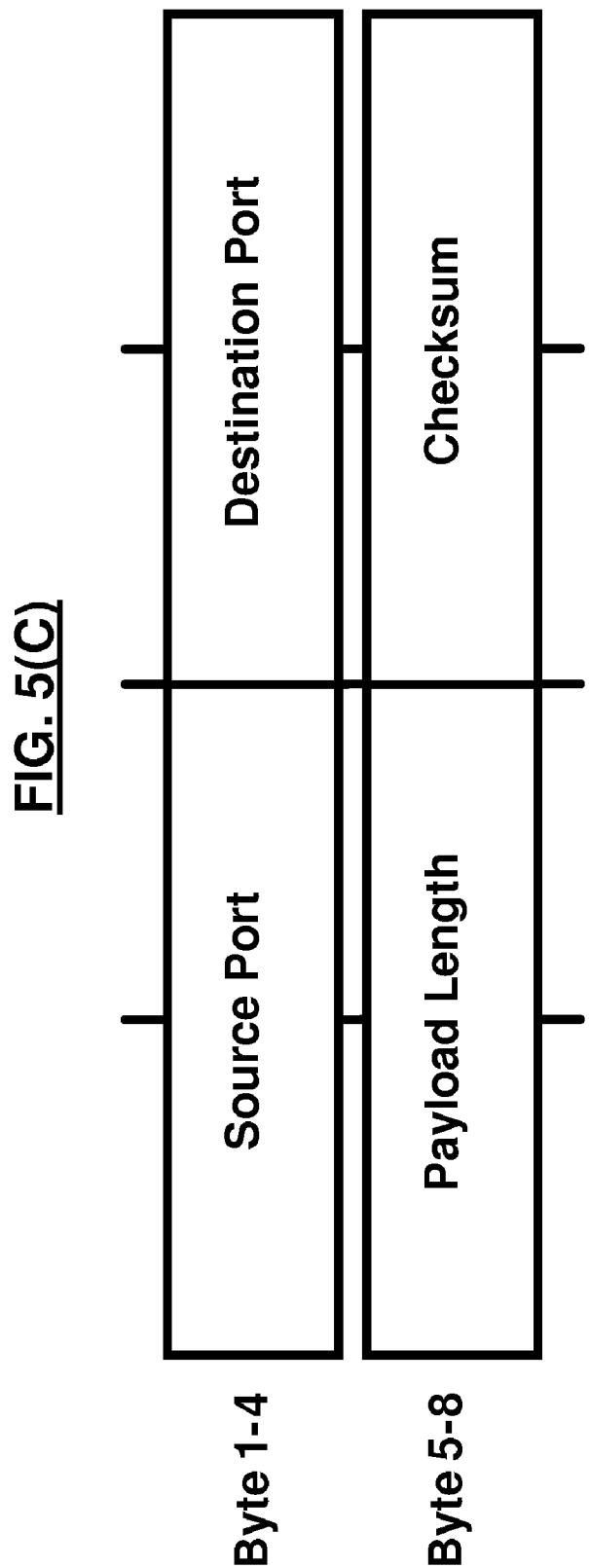

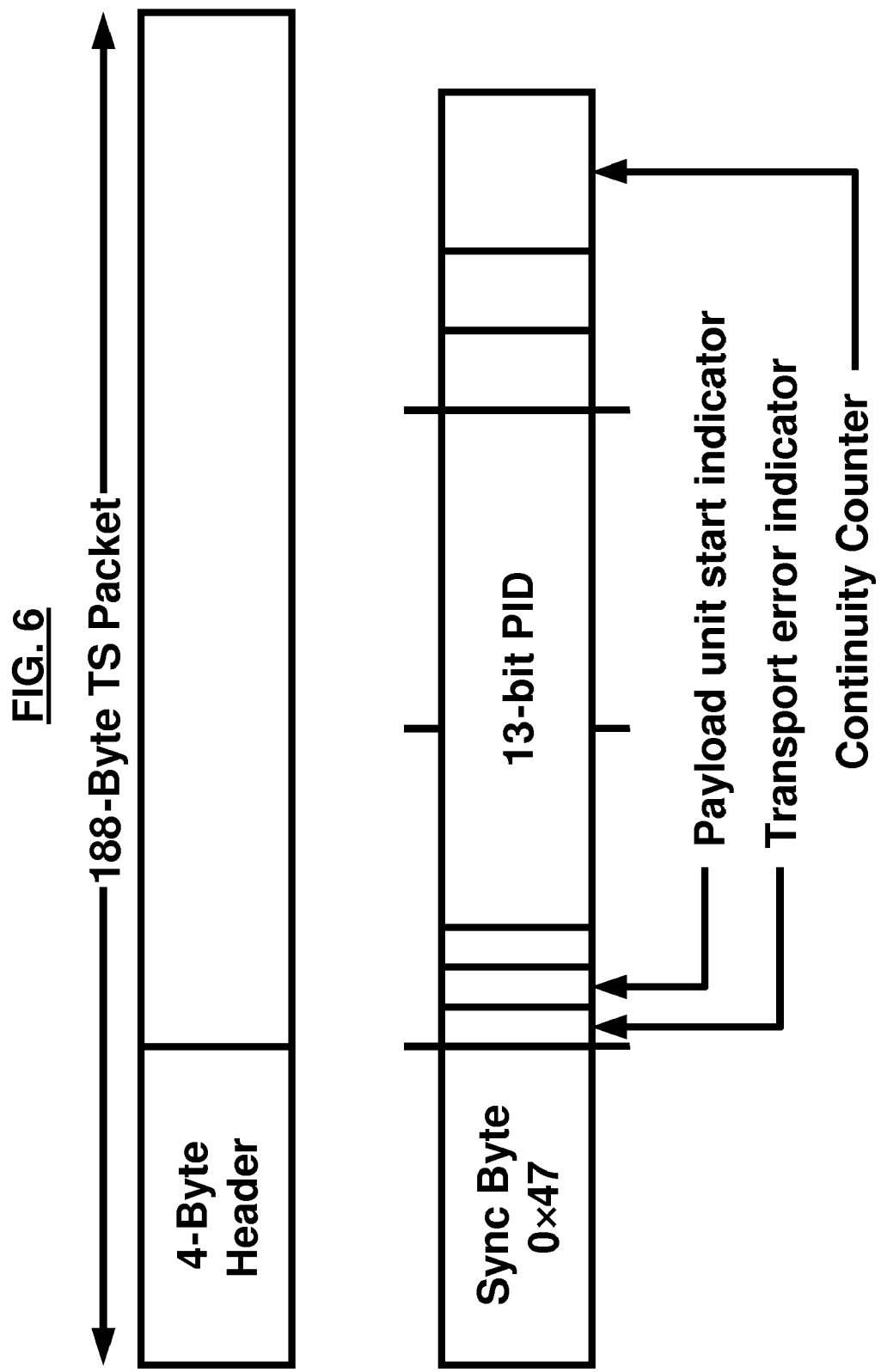

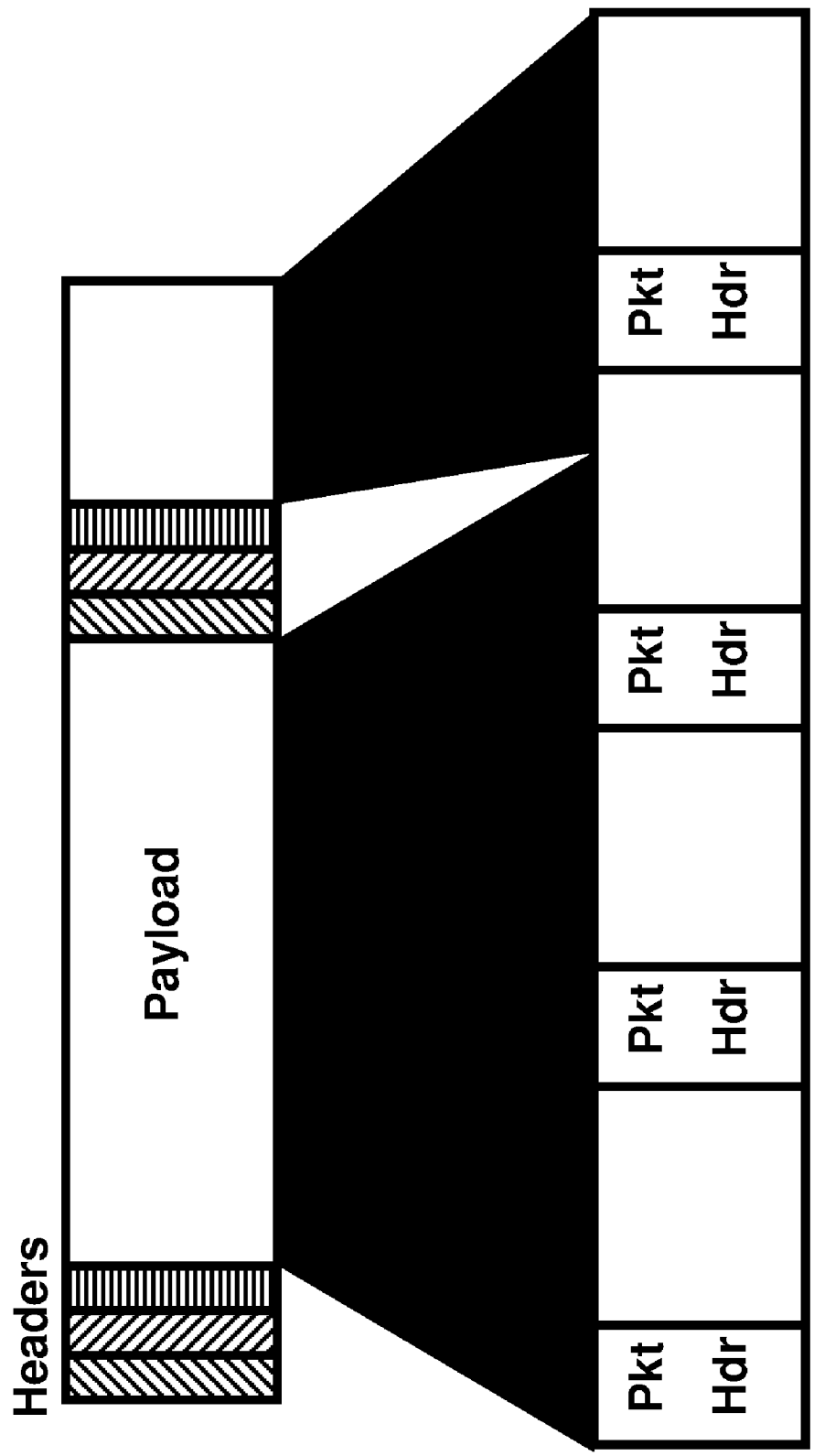

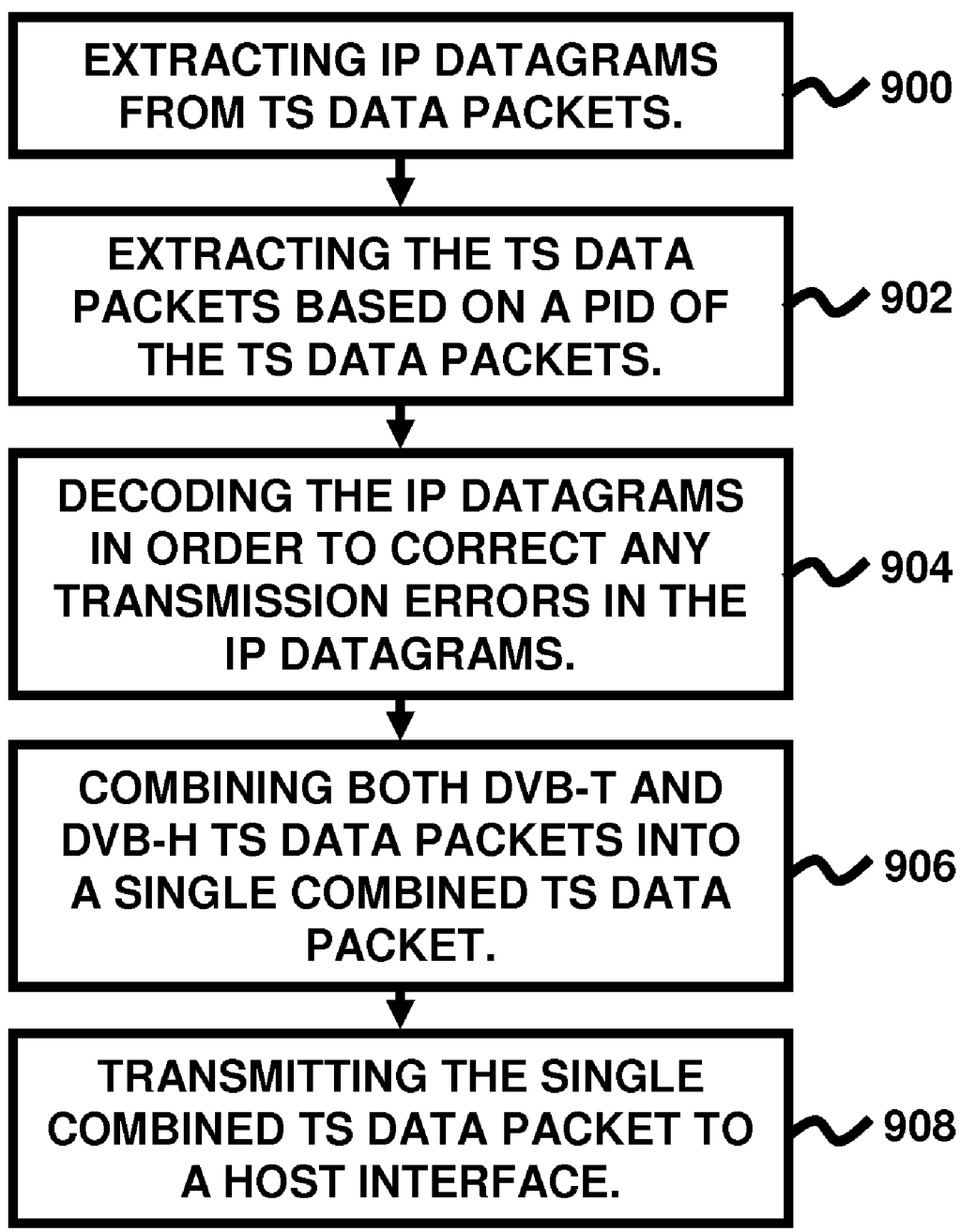

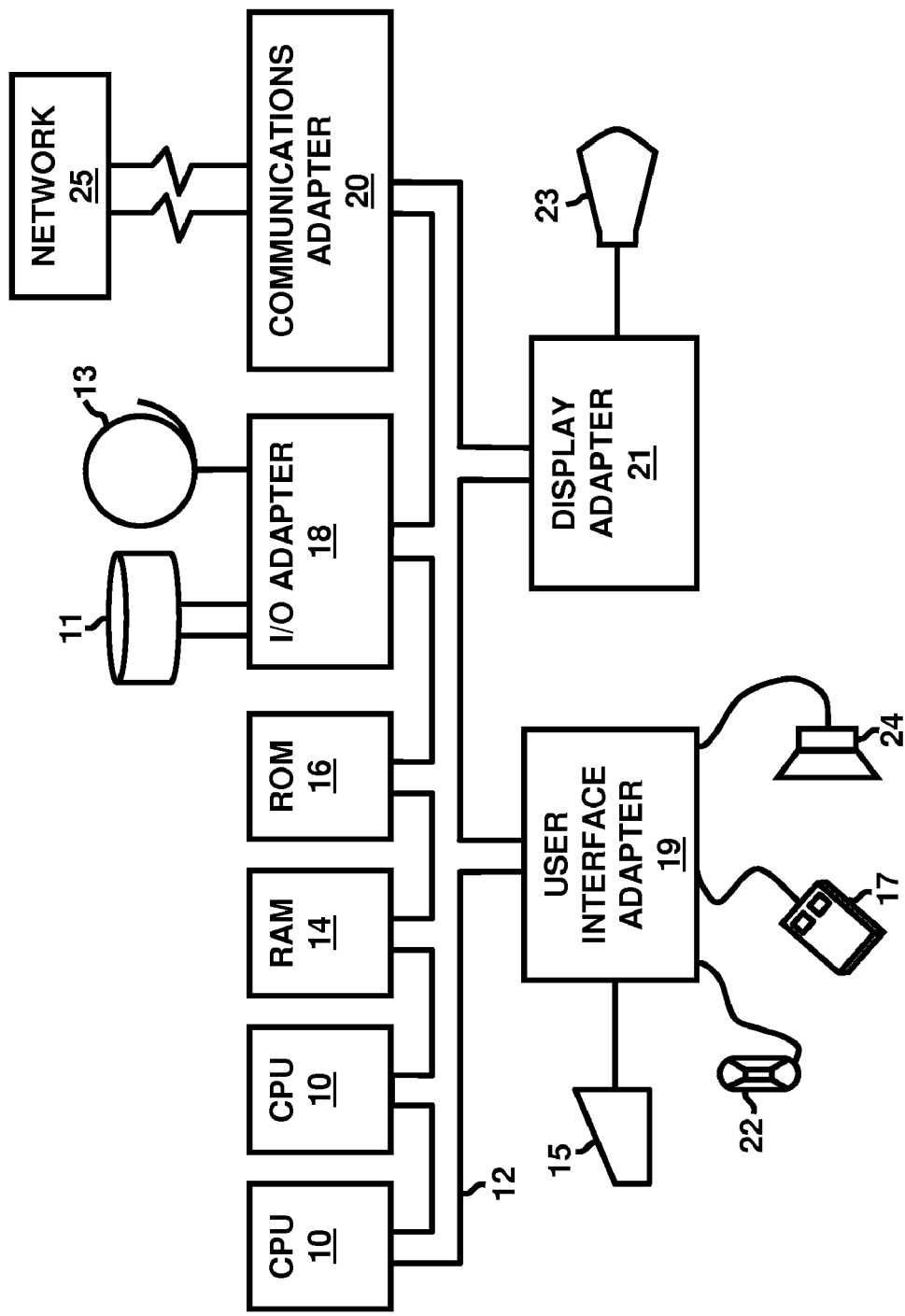

UNIFIED INTERFACING FOR DVB-T/H MOBILE TV APPLICATIONS

BACKGROUND

1. Technical Field

The embodiments herein generally relate to wireless technologies, and, more particularly, to digital video broadcasting for handheld (DVB-H) television (TV) systems.

2. Description of the Related Art

In DVB-T (terrestrial) TV systems, video is carried over Moving Picture Experts Group-2 (MPEG-2) transport stream (TS) packets, with each TS packet being 188 bytes long. A DVB-T receiver normally consists of a radio frequency (RF) tuner, a demodulator, and a video decoder. The demodulator output is usually embodied as TS packets that are carried to the video decoder through a TS interface. Some examples of such TS interfaces are digital video broadcasting-synchronous parallel interface (DVB-SPI) and asynchronous serial interface (ASI) interfaces.

DVB-H mobile TV systems, on the other hand, transmit video over internet protocol (IP) packets (also known as IP datagrams). In order to be backward compatible with DVB-T and DVB-H, internet protocol (IP) datagrams are mapped into TS packets and multiplexed with other DVB-T TS packets. This is how DVB-T and DVB-H services can share the same physical layer (PHY).

A typical DVB-H receiver extracts DVB-H IP datagrams from TS packets as shown in FIG. 1. A TS demultiplexer (demux) is used to extract IP datagrams from TS packets. The IP datagrams are collected in a memory known as Multi Protocol Encapsulation-Forward Error Correction (MPE-FEC) random access memory (RAM). Reed Solomon (RS) decoding is performed on the collected datagrams to correct any transmission errors. The corrected IP datagrams are then forwarded to the video decoder (or applications host processor) through an IP interface, such as secure digital input/output (SDIO), SPI, or universal serial bus (USB) interfaces.

If simultaneous DVB-T/DVB-H reception is required, the receiver typically has to have two interfaces as shown in FIG. 2. Moreover, a TS interface for DVB-T TS and an IP interface for IP datagrams are both needed. Having two different interfaces between the demodulator and the host processor is not desirable as this adds significant complexity and power consumption. Accordingly, there remains a need for a new manner of allowing DVB-T/DVB-H reception without requiring two interfaces.

SUMMARY

In view of the foregoing, an embodiment herein provides a DVB-H receiver comprising a TS demultiplexer adapted to extract IP datagrams from TS data packets; a packet identifier (PID) filter adapted to extract the TS data packets based on the PIDs of the TS data packets; a MPE-FEC RAM unit operatively connected to the TS demultiplexer; a Reed-Solomon decoder operatively connected to the MPE-FEC RAM unit; an IP to TS encapsulator operatively connected to the MPE-FEC RAM unit; a TS multiplexer operatively connected to each of the PID filter and the IP to TS encapsulator, wherein the TS multiplexer is adapted to combine both DVB-T and DVB-H TS data packets into a single combined TS data packet; and a host interface operatively connected to the TS multiplexer. Preferably, the MPE-FEC RAM unit is adapted to collect the extracted IP datagrams. Moreover, the RS decoder is preferably adapted to perform decoding on the collected IP datagrams in order to correct any transmission errors in the IP datagrams. Additionally, the DVB-H receiver may further comprise a TS interface operatively connected between the TS multiplexer and the host interface. Also, the DVB-H receiver may further comprise an IP interface operatively connected between the TS multiplexer and the host interface. Preferably, the host interface comprises any of a host IP interface and a host TS interface.

Another embodiment provides a DVB-H receiver comprising a physical layer adapted to receive TS data packets, wherein the TS data packets comprise IP datagrams; a PID filter adapted to extract the TS data packets based on the PIDs of the TS data packets; and a data link layer adapted to receive the TS data packets, wherein the data link comprises a TS demultiplexer; a MPE-FEC RAM unit operatively connected to the TS demultiplexer; a Reed-Solomon decoder operatively connected to the MPE-FEC RAM unit; and an IP to TS encapsulator operatively connected to the MPE-FEC RAM unit. The DVB-H receiver further comprises a TS multiplexer operatively connected to each of the PID filter and the IP to TS encapsulator, wherein the TS multiplexer is adapted to receive a DVB-H TS data packet comprising IP datagrams corrected by the Reed-Solomon decoder; and combine both DVB-T and DVB-H TS data packets into a single combined TS data packet. Furthermore, the DVB-H receiver comprises a host interface operatively connected to the TS multiplexer. Preferably, the TS demultiplexer is adapted to extract the IP datagrams from the TS packets. Furthermore, the MPE-FEC RAM unit is preferably adapted to collect the extracted IP datagrams. Additionally, the RS decoder may be adapted to perform decoding on the collected IP datagrams in order to correct any transmission errors in the IP datagrams. The DVB-H receiver may further comprise a TS interface operatively connected between the TS multiplexer and the host interface. Moreover, the DVB-H receiver may further comprise an IP interface operatively connected between the TS multiplexer and the host interface. Also, the host interface may comprise any of a host IP interface and a host TS interface.

Another embodiment provides a method of transmitting data in a DVB-H receiver, wherein the method comprises extracting IP datagrams from TS data packets; extracting the TS data packets based on a PID of the TS data packets; decoding the IP datagrams in order to correct any transmission errors in the IP datagrams; combining both DVB-T and DVB-H TS data packets into a single combined TS data packet; and transmitting the single combined TS data packet to a host interface. The method may further comprise transmitting the single combined TS data packet through a TS interface prior to transmission to the host interface. Also, the method may further comprise transmitting the single combined TS data packet through an IP interface prior to transmission to the host interface. Additionally, the method may further comprise dividing the IP datagrams into 184-byte packets; attaching a 4-byte header at the beginning of each the TS data packet to form a valid TS data packet; setting a payload unit start indicator bit equal to one for a first data packet and a last data packet of each data burst, wherein the number of IP bytes in the first data packet is 183 bytes; setting a fifth byte of the first data packet to 0x00; setting a fifth byte of the last packet to the number of remaining bytes of the data burst; and appending zeros to an end of the last packet when the number of the remaining bytes is less than 183. Preferably, each header starts with a sync byte equaling 0x47 and comprises a PID equal to an original service PID.

Furthermore, the method may further comprise carrying an integer number of the TS data packets in each of the IP datagrams when the IP datagrams comprise MPEG TS data packets; and removing IP/UDP/RTP headers from each the TS data packet before the TS packets are transmitted through to the host interface. Additionally, the method may further comprise removing IP/UDP/RTP headers from each the TS data packet when an IP datagram payload is non-MPEG formatted; dividing the IP datagram payload into 184-byte data packets comprising a 4-byte header attached thereto; and transmitting formed TS data packets through to the host interface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4(A) through 4(D) illustrate schematic diagrams of video transmission configurations used in accordance with the embodiments herein;

FIGS. 5(A) through 5(D) illustrate schematic diagrams of header formats used in accordance with the embodiments herein;

FIG. 6 illustrates a schematic diagram of a TS packet format used in accordance with the embodiments herein;

FIGS. 7(A) and 7(B) illustrate schematic diagrams of encapsulation schemes according to the embodiments herein;

FIG. 9 is a flow diagram illustrating a preferred method according to an embodiment herein; and FIG. 10 illustrates a schematic diagram of a computer system according to an embodiment herein.

DETAILED DESCRIPTION OF PREFERRED EMBODIMENTS

Figure 1:
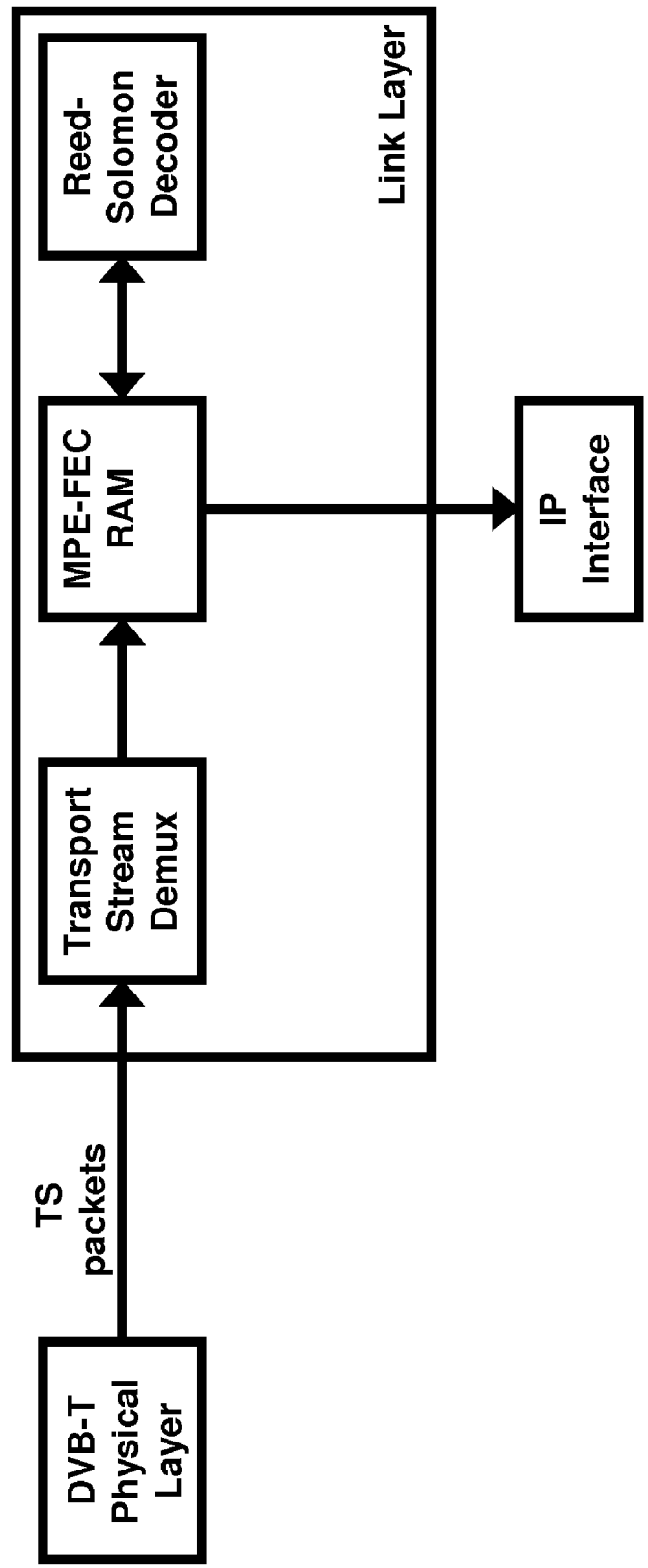
FIGS. 1 and 2 illustrate schematic diagrams of conventional receiver architectures.
Figure 2:
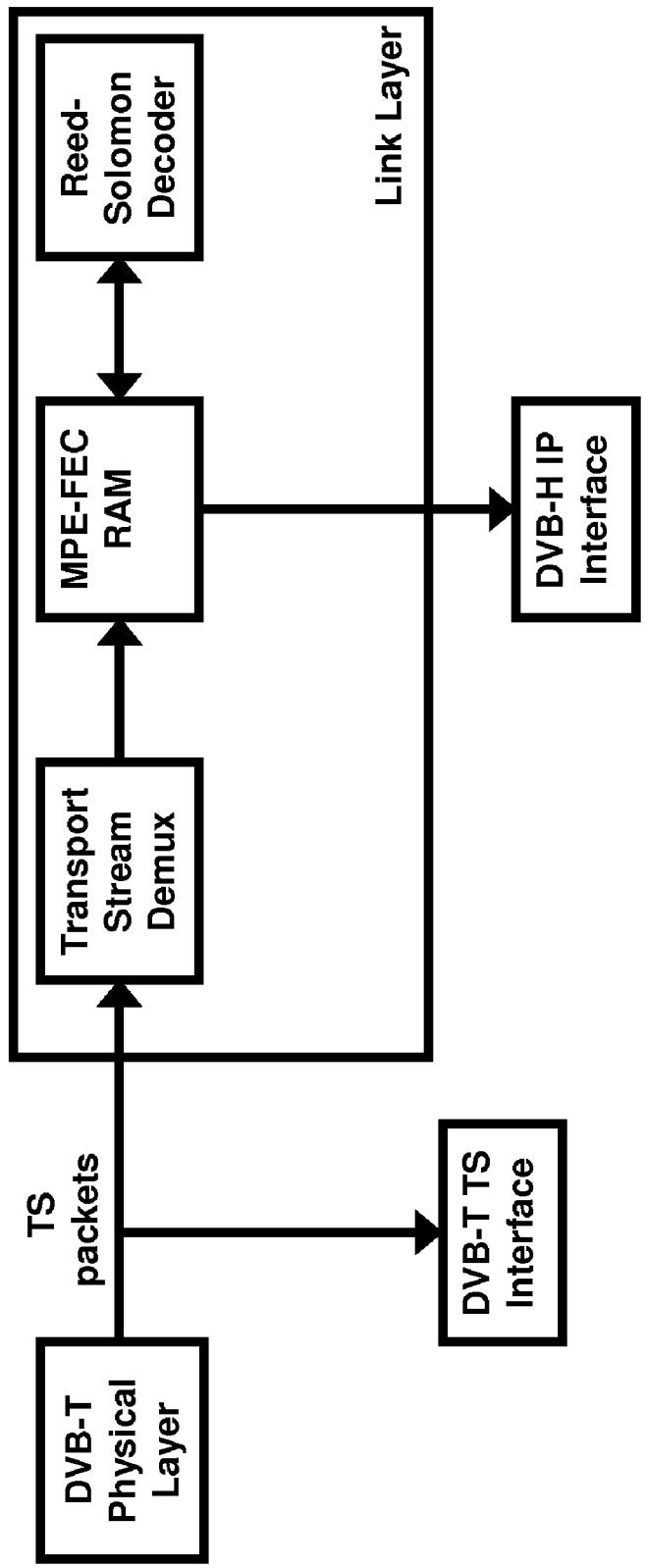

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new manner of allowing DVB-T/DVB-H reception without requiring two interfaces. The embodiments herein achieve this by providing a single interface for both DVB-T TS packets and DVB-H IP datagrams. Referring now to the drawings, and more particularly to FIGS. 3 through 10, where similar reference characters denote corresponding features consistently throughout the figures, there are shown preferred embodiments.

Figure 3:
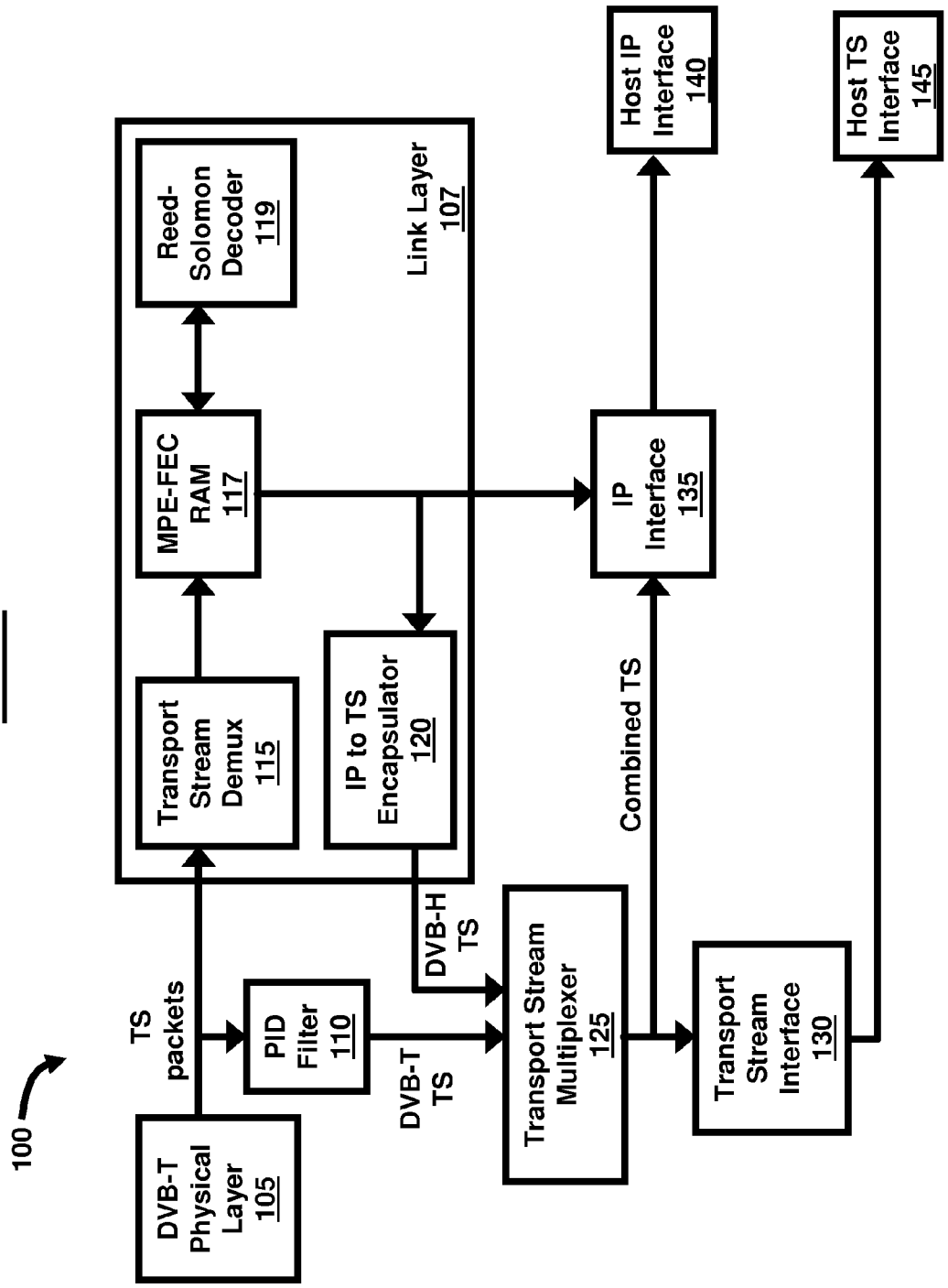
FIG. 3 illustrates a schematic diagram of a receiver architecture according to an embodiment herein.

FIG. 3 illustrates the manner in which the embodiments herein provide a single interface for both DVB-T TS packets and DVB-H IP datagrams. In this scheme, preferably embodied in a DVB-H receiver 100 platform, the DVB-T TS packets originating from a DVB-T physical layer (PHY) 105 are extracted based on their Packet Identifier (PID) through a PID filter 110. The corrected IP datagrams are converted to a TS packet format through an IP to TS encapsulator 120 to form a DVB-H TS. Both DVB-T and DVB-H TS are combined through a TS multiplexer 125 to form a single combined TS. The combined TS is either passed directly to the host IP interface 140 or to the host TS interface 145 through a TS interface 130 or through an IP interface 135, respectively. In the link layer 107, a TS demux 115 is used to extract IP datagrams from TS packets. The IP datagrams are collected in a memory known as a MPE-FEC RAM 117. RS decoding is performed on the collected datagrams, using a RS decoder 119, to correct any transmission errors.

The embodiments herein provide multiple schemes for transferring IP datagrams used in DVB-H systems to carry video and audio content through a TS serial interface. Moreover, different schemes according to the embodiments herein are provided depending on the encoding format and the reception quality. Furthermore, in multi-standard mobile TV receivers, such as a DVB-H/T-DMB or DVB-H/ISDB-T receiver, the embodiments herein may be used as the output of Integrated Services Digital Broadcasting-Terrestrial (ISDB-T) and Terrestrial-Digital Multimedia Broadcasting (T-DMB) systems is TS packets.

First, with respect to video transmission over IP in DVB-H systems, video data is carried over IP packets. Each packet comprises an IP header and payload. The IP payload can carry multiple protocols and such as User Datagram Protocol (UDP) and Real-time Transport Protocol (RTP). Each of these protocols has its own header and payload. For video streaming, UDP over IP is used. If real-time parameters are needed to be transmitted in the UDP payload, RTP is used over UDP. Different combinations of the previously mentioned protocols are currently employed in video streaming in DVB-H. Video data that is carried by these protocols come in different formats like MPEG transport streams, H.264, Windows™ Media Video (WMV), etc. The following configurations may be used.

First, IP/UDP/TS is illustrated in FIG. 4(A). Here, MPEG TS packets can carry packetized elementary streams (PES) that include video and audio information. Each packet is 188-byte long with a 4-byte header that starts with a sync byte (0x47). An integer number of TS packets are carried over UDP/IP. Second, IP/UDP/RTP/TS is illustrated in FIG. 4(B). Here, MPEG TS packets are carried over RTP. RTP is suitable for transmitting real-time data like video and audio. The RTP header carries timing information and packet counter that allow monitoring of data delivery in order. Third, IP/UDP/non-MPEG is illustrated in FIG. 4(C). The UDP/IP payload is the encoded video stream that is not in the MPEG format (such as H.264, WMV, etc.). No timing information is transmitted in this scheme. Fourth, IP/UDP/RTP/non-MPEG is illustrated in FIG. 4(D). Here, the payload is a non-MPEG encoded video stream. Timing information that is used to synchronize the transmitted streams is carried in the RTP header.

The various header formats used in accordance with the embodiments herein are illustrated in FIGS. 5(A) through 5(D). First, with respect to the Internet Protocol Version 4 (IPV4) header shown in FIG. 5(A), the first 4 bits (bytes 1-4)

of the IP header carry the IP version. Preferably, they should be 0x4 when IPV4 is used. The header length is carried in the following 4 bits (bytes 5-8). The typical header length is 20 bytes unless the options/padding fields are used. The total IP datagram length can be obtained from bytes 3-4. Furthermore, the source and destination IP addresses are provided in bytes 13-16 and 17-20, respectively.

Second, with respect to the Internet Protocol Version 6 (IPV6) header shown in FIG. 5(B), if IPV6 is used, the first 4 bits (bytes 1-4) should preferably be 0x6. The datagram length is given in bytes 5-6. Both the source and destination addresses are 16 bytes long and are carried in bytes 9-24 and byte 25-40, respectively. Moreover, the header length is fixed and equal to 40 bytes.

Third, with respect to the UDP header shown in FIG. 5(C), the UDP header is 8 bytes long. The first four bytes (bytes 1-4) represent the source and destination ports. Bytes 5 and 6 carry the payload length which is the difference between the IP datagram length and the datagram header length. Furthermore, the Checksum field is optional.

Figure 5D:
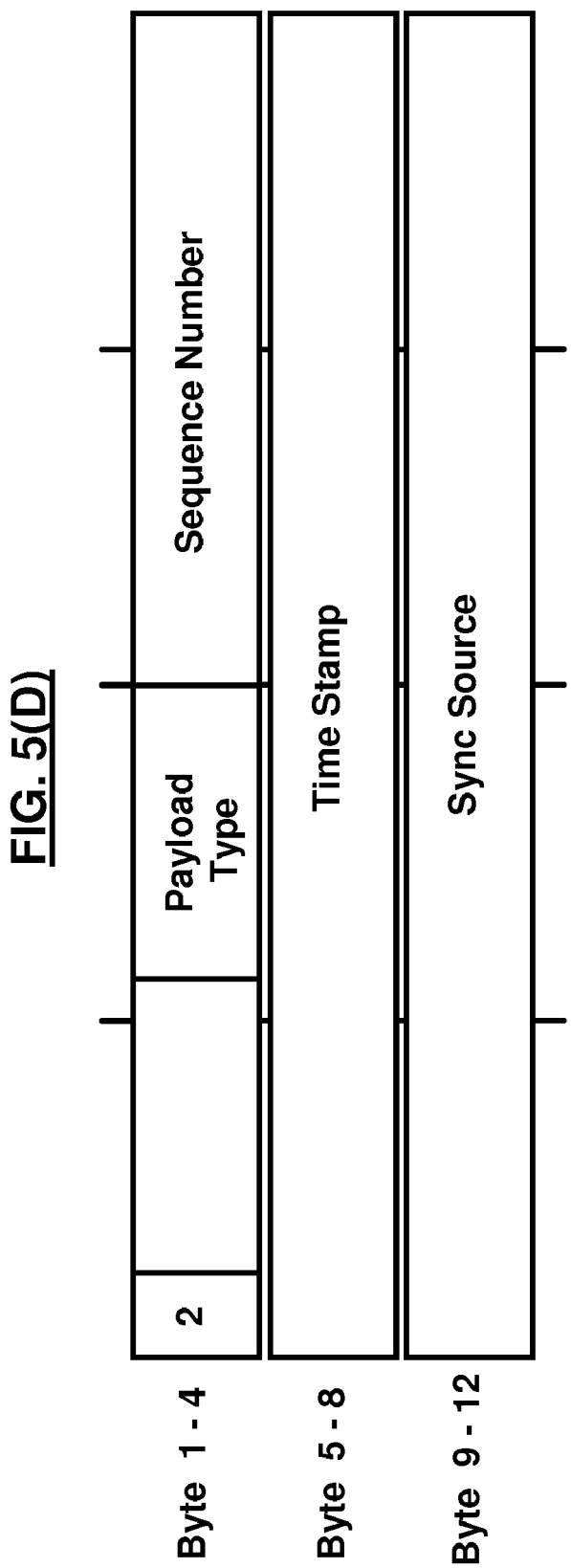

Fourth, with respect to the RTP header shown in FIG. 5(D), if the RTP protocol is used, an RTP header exists immediately following the end of UDP header. The RTP header length is 12 bytes. The first two bits are always $10_b$ (2). Bits 9-15 represent the payload type (audio, video, etc.). Bytes 3-4 is a counter that counts the number of packets and is initialized to a random value. Furthermore, the counter is incremented by one for every RTP packet.

FIG. 6 illustrates the TS Packet format. Here, each TS packet is 188 bytes and starts with a Sync-byte that is set to 0x47. A unique 13-bit PID is used for each service carried by the packets. The start of new payload is marked by the Payload Unit Start Indicator being set to 1. In such a case, the fifth byte of the packet contains a pointer to the location of the first byte of the new payload. A 4-bit continuity counter is incremented in the packets that belong to the same service. The counter wraps around after reaching its maximum.

Figure 7A:
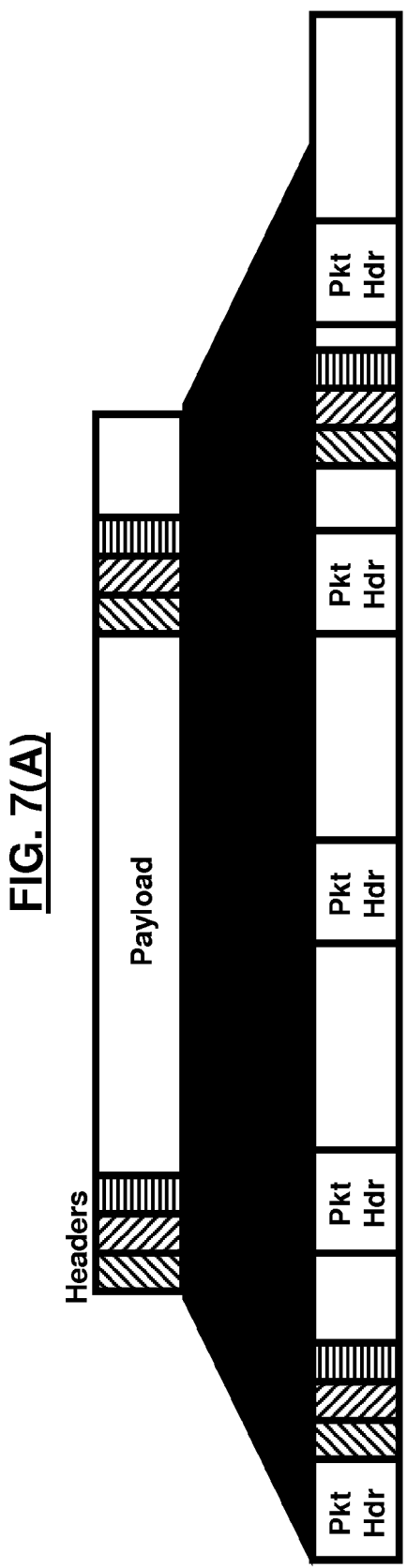

The embodiments herein provide three alternative encapsulation schemes. The three different schemes send IP datagrams or their contents through the transport stream serial interface. Generally, in the first encapsulation scheme, IP datagrams are divided into 184-byte packets. As shown in FIG. 7(A), a 4-byte header is attached at the beginning of each packet to form a valid transport stream packet. Each header preferably starts with the sync byte (0x47) and preferably has a PID equal to the original service PID. The first packet and the last packet of each burst preferably have the payload unit start indicator bit set to 1. The fifth byte of the first packet is set to 0x00. The number of IP bytes in the first packet is 183 bytes. The fifth byte of the last packet is set to the number of remaining bytes of the burst. If the number of the remaining bytes is less than 183, zeros are appended to the end of the last packet. This scheme is independent of the video/audio encoding scheme. When used, IP processing is performed in the host side of the TS interface.

Generally, in the second encapsulation scheme, if the IP datagrams contain MPEG TS packets, then an integer number of TS packets are carried in each IP datagram. In this case, the IP/UDP/RTP headers are removed before the TS packets are sent through the TS interface in order. No additional headers are needed. This is generally shown in FIG. 7(B).

Generally, in the third encapsulation scheme, if the IP datagram payload is non-MPEG formatted (for example, WMV or H.264), the IP/UDP/RTP headers are first removed and the payload is divided into 184-byte packets with a 4-byte header attached as described in the first encapsulation scheme above. Thereafter, the formed packets are sent through the TS interface.

The operation of the three alternative encapsulation schemes as described above are shown in FIGS. 8(A) through 8(C). When the encapsulation process begins (800), the proper encapsulation scheme is selected (801). If the first encapsulation scheme (Scheme 1) is selected, then a whole burst encapsulation process (802) is performed, after which the process ends (803).

Figure 8A:
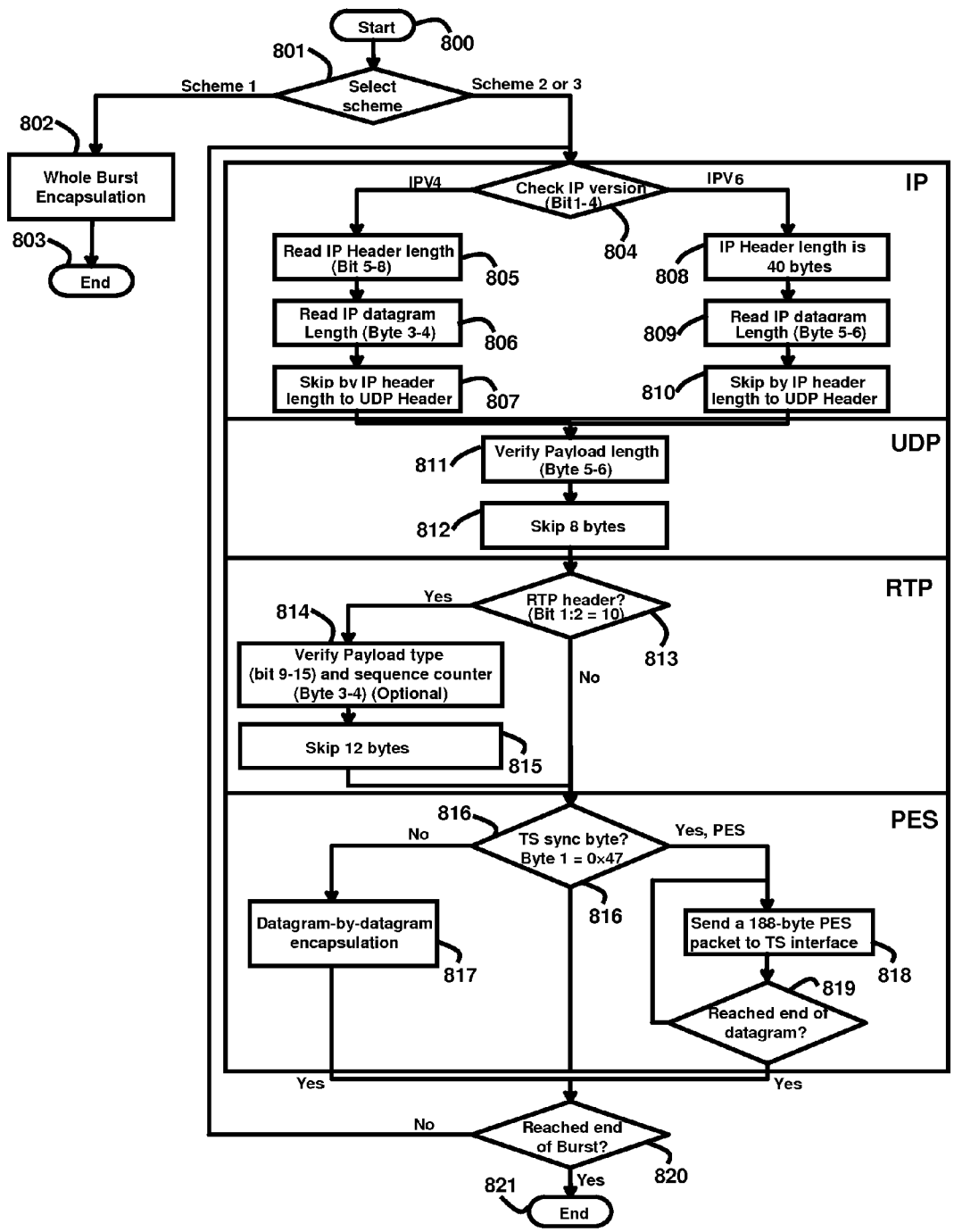
FIGS. 8(A) through 8(C) are flow diagrams illustrating encapsulation schemes according to the embodiments herein.
Figure 8B:
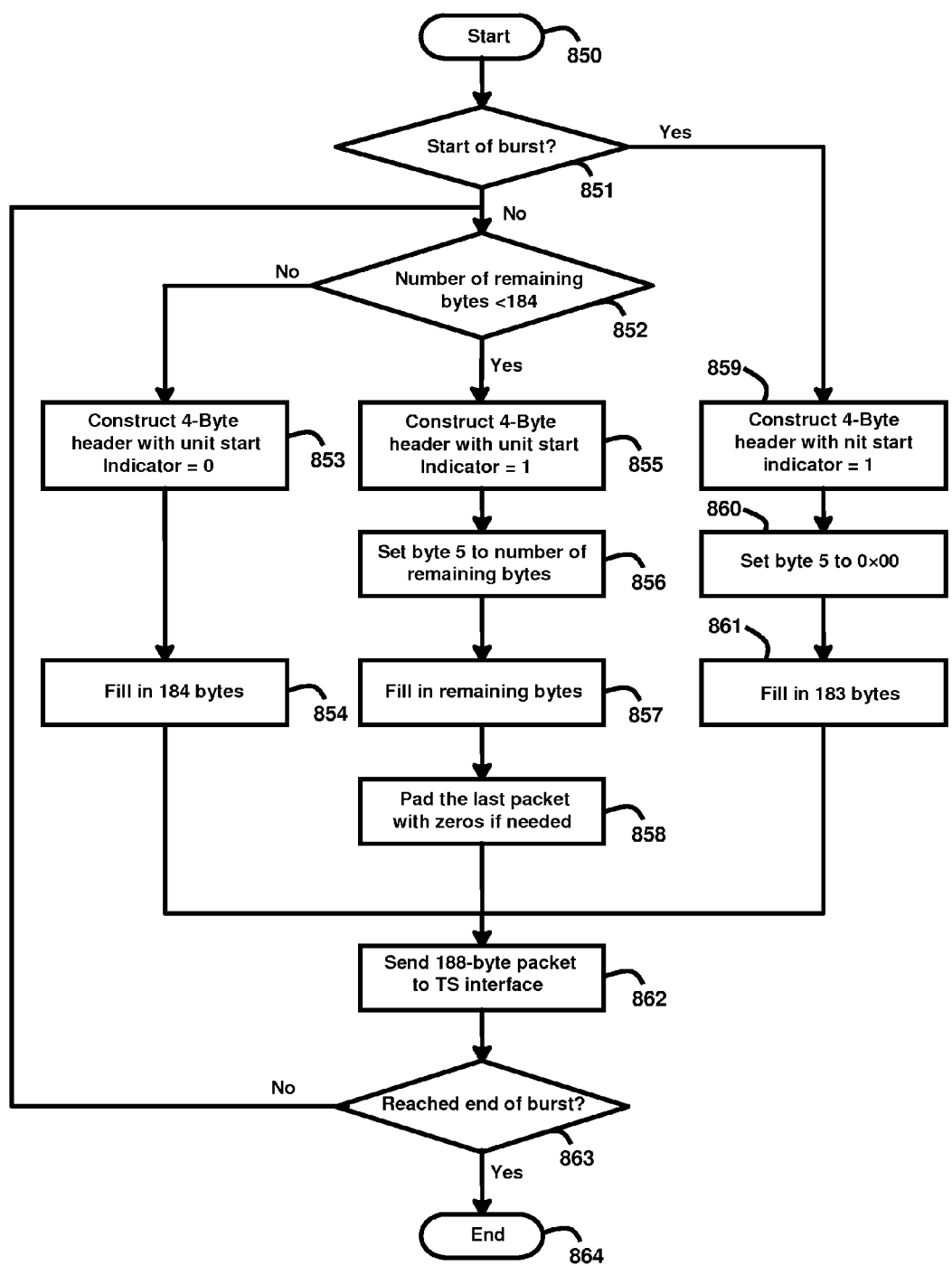

More specifically, with respect to the first encapsulation scheme (Scheme 1 shown in more detail in FIG. 8(B)), the process begins (850) when IP datagrams corresponding to one burst are ready to be streamed out (851), the following steps occur:

1. Set a pointer to the current byte to be streamed out (data_ptr).
2. Construct (859) a 4-byte TS packet header using the following settings:
   Sync byte=0x47
   PID=PID of the original service
   Payload unit start indicator=1
   Continuity counter=0
3. Set (860) the fifth byte of the packet to 0x00.
4. Increment (861) data_ptr by 183 bytes and increment continuity counter by 1.
5. Send (862) 183 data bytes following the packet header and fifth byte through the TS interface. [
6. Calculate (852) the number of remaining burst bytes as: num_remaining_bytes=end_of_burst-data_ptr.
7. If (num_remaining_bytes≧184) (Intermediate packet) Construct (853) a 4-byte TS packet header with payload unit start indicator=0 and the updated continuity counter.
   Send (854) 184 data bytes following the packet header through the TS interface.
   Increment data_ptr by 184 bytes and increment continuity counter by 1.
   Go back to step 6.
8. If (num_remaining_bytes<184) (last packet)
   Construct (855) a 4-byte TS packet header with payload unit start indicator=1 and the updated continuity counter.
   Set (856) the fifth byte of the packet to num_remaining_bytes.
   Send (857) the remaining bytes following the packet header and fifth byte.
   Fill (858) the rest of the packet with zeros. (Add 188-num_remaining_bytes-5 zero bytes).
9. Finish (863) and wait (864) for the next burst.

Figure 8C:
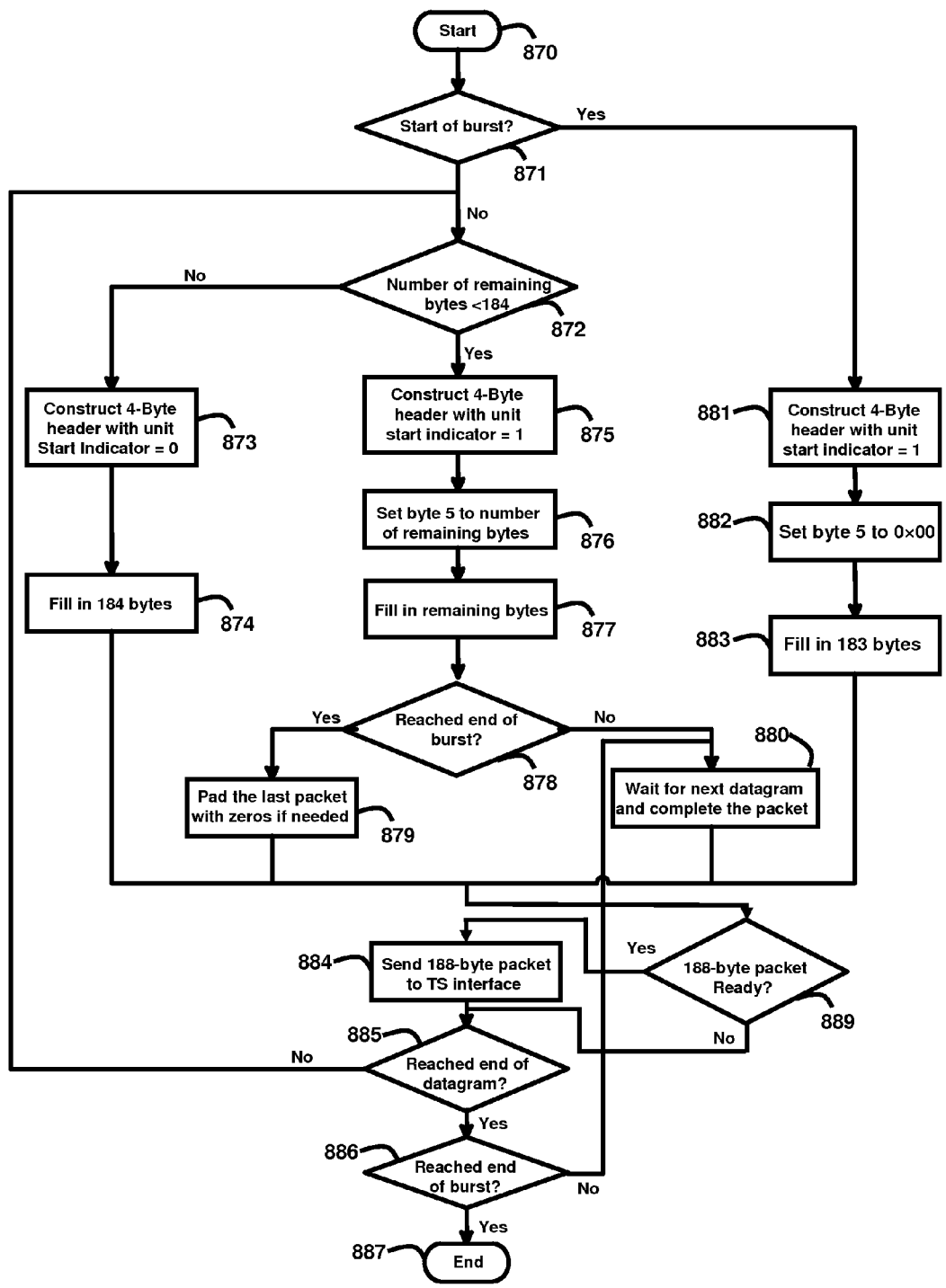

More specifically, with respect to the second and third encapsulation schemes (FIG. 8(A) and the datagram-by-datagram encapsulation scheme of FIG. 8(C)), the process begins (850) when IP datagrams corresponding to one burst are ready to be streamed out, the following steps occur:

1. Set a pointer to the first byte of the datagram (datagram_ptr).
2. Read the first four bits of the IP datagram to determine (804) the IP version.
3. If Version 4 (IPV4) is detected:
   Read (805) the header length from bit 5-8 of the IP header.
   Read (806) the datagram length (datagram_length) from byte 3-4 of the IP header.
4. If Version 6 (IPV6) is detected:
   The header length is fixed (808) and equals 40 bytes.
   Read (809) the datagram length (datagram_length) from byte 5-6 of the IP header.

5. Set end_of_datagram=datagram_ptr+datagram_length.

6. Increment (807, 810) the datagram_ptr by the IP header length. Datagram_ptr should point at the first byte of the UDP header.

7. Read the UDP packet length from byte 5 and 6 of the UDP header. Verify (811) that the value read equals to the difference between datagram_length and IP header length.

8. Increment (812) the datagram_ptr by 8 bytes (UDP header length). Datagram_ptr should now point to either the first byte of the Payload of the first byte of the RTP header.

9. Read the first two bits at datagram_ptr. If (813) they are equal to $10_b$ (2), then the following 12 bytes represent the RTP header, else skip to step 10.

10. If RTP header is detected (Yes), then bytes 3 and 4 of the RTP header carry a sequence number that increments by one every datagram. It can be used to verify (814) the continuity of the video packets.

11. Increment (815) the datagram_ptr by 12 bytes (RTP header length). Datagram_ptr should now point to the first byte of the Payload.

12. Scheme 2: If (816) the first byte of the payload is (0x47) (Yes), then MPEG TS is carried in this IP datagram. Send (818) all 188-byte MPEG packets in the datagram through the TS interface. Go back (819) to step 1. If (820) the end of the data burst has been reached, then the process ends (821).

13. Scheme 3: If the first byte of the payload in not equal to (0x47) (No), then the non_MPEG payload is carried in the IP datagram. Proceed through a datagram-by-datagram encapsulation process (817) as follows (as shown in FIG. 8(C)) with the process begins (870) with the detection (871) of the beginning of a data burst:

If (872) there is an incomplete packet from the previous datagram, send the remaining bytes in that packet first.

Generate a 4-byte packet header (873, 875, 881) with the original service PID.

If (872) the number of remaining bytes in the datagram (num_remaining_bytes) is less than 184, set (876) the fifth byte of the packet to num_remaining_bytes.

For the first packet of the burst, set (881) the payload unit start indicator to 1.

Set (882) the fifth byte to 0x00 for the first packet and to the number of remaining bytes (877) of the last datagram for the last packet.

Fill (874) 184 bytes (fill (883) 183 bytes for the first packet).

Repeat until the end_of_datagram is reached (878). If the number of bytes at the end of the datagram is not (No) sufficient to fill a complete packet, continue (880) at the next datagram.

Go back to Step 1. Otherwise (Yes), pad (879) the last packet with zeros if needed.

If a 188-byte packet is ready (Yes) (889) (coming from (874, 883, or 879)), send (884) 188 bytes through the TS interface.

Otherwise (No), determine (885) whether the end of the datagram has been reached.

If not (No), go back to Step 1. Otherwise (Yes), determine (886) whether the end of the data burst has been reached. If not (No), continue (880) at the next datagram.

Otherwise (Yes), it is the end (887) of the process.

In the third encapsulation scheme, different combinations of header removal can be applied. For example, the following combinations may be used:

1. Keep all headers: Perform steps 1-5 and 13.
2. Remove IP Header only: Perform steps 1-6 and 13.
3. Remove IP/UDP headers: Perform steps 1-8 and 13.
4. Remove IP/UDP/RTP headers: Perform steps 1-13.

FIG. 9, with reference to FIGS. 3 through 8(C), is a flow diagram illustrating a method of transmitting data in a DVB-H receiver 100 according to an embodiment herein, wherein the method comprises extracting (900) IP datagrams from TS data packets; extracting (902) the TS data packets based on a PID of the TS data packets; decoding (904) the IP datagrams in order to correct any transmission errors in the IP datagrams; combining (906) both DVB-T and DVB-H TS data packets into a single combined TS data packet; and transmitting (908) the single combined TS data packet to a host interface 140, 145. The method may further comprise transmitting the single combined TS data packet through a TS interface 130 prior to transmission to the host interface 145. Also, the method may further comprise transmitting the single combined TS data packet through an IP interface 135 prior to transmission to the host interface 140. Additionally, the method may further comprise dividing the IP datagrams into 184-byte packets; attaching a 4-byte header at the beginning of each the TS data packet to form a valid TS data packet; setting a payload unit start indicator bit equal to one for a first data packet and a last data packet of each data burst, wherein the number of IP bytes in the first data packet is 183 bytes; setting a fifth byte of the first data packet to 0x00; setting a fifth byte of the last packet to the number of remaining bytes of the data burst; and appending zeros to an end of the last packet when the number of the remaining bytes is less than 183. Preferably, each header starts with a sync byte equaling 0x47 and comprises a PID equal to an original service PID.

Furthermore, the method may further comprise carrying an integer number of the TS data packets in each of the IP datagrams when the IP datagrams comprise MPEG TS data packets; and removing IP/UDP/RTP headers from each the TS data packet before the TS packets are transmitted through to the host interface 145. Additionally, the method may further comprise removing IP/UDP/RTP headers from each the TS data packet when an IP datagram payload is non-MPEG formatted; dividing the IP datagram payload into 184-byte data packets comprising a 4-byte header attached thereto; and transmitting formed TS data packets through to the host interface 145.

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein may be implemented in DVB-H systems and may be implemented in the baseband chipsets that support mobile TV standards including DVB-H/ISDB-T/DAB/DAP-IP/DMB/MediaFlo™, etc. Moreover, the embodiments herein may be applied to any application where data bytes are not carried in the transport stream packet formats and are needed to be sent out through a TS interface. In this sense, the embodiments herein are not limited to the standards mentioned above, but also extend to any device/standard that send arbitrary data through a TS interface.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A digital video broadcast handheld (DVB-H) receiver comprising:
    a transport stream (TS) demultiplexer that extracts internet protocol (IP) datagrams from TS data packets;
    a packet identifier (PID) filter that extracts said TS data packets based on the PIDs of said TS data packets;
    a Multi Protocol Encapsulation-Forward Error Correction (MPE-FEC) random access memory (RAM) unit operatively connected to said TS demultiplexer, wherein said MPE-FEC RAM unit corrects said IP datagrams and stores the corrected IP datagrams;
    a Reed-Solomon decoder operatively connected to said MPE-FEC RAM unit;
    an IP to TS encapsulator operatively connected to said MPE-FEC RAM unit, wherein said IP to TS encapsulator converts said corrected IP datagrams to DVB-H TS data packets;
    a TS multiplexer operatively connected to each of said PID filter and said IP to TS encapsulator, wherein said TS multiplexer combines both DVB-Terrestrial (DVB-T) and DVB-H TS data packets into a single combined TS data packet; and
    a host interface operatively connected to said TS multiplexer.

2. The DVB-H receiver of claim 1, wherein said MPE-FEC RAM unit collects the extracted IP datagrams.

3. The DVB-H receiver of claim 2, wherein said RS decoder performs decoding on the collected IP datagrams in order to correct any transmission errors in said IP datagrams.

4. The DVB-H receiver of claim 1, further comprising a TS interface operatively connected between said TS multiplexer and said host interface.

5. The DVB-H receiver of claim 1, further comprising an IP interface operatively connected between said TS multiplexer and said host interface.

6. The DVB-H receiver of claim 1, wherein said host interface comprises any of a host IP interface and a host TS interface.

7. A digital video broadcast handheld (DVB-H) receiver comprising:
   a physical layer that receives transport stream (TS) data packets, wherein said TS data packets comprise internet protocol (IP) datagrams;
   a packet identifier (PID) filter that extracts said TS data packets based on the PIDs of said TS data packets;
   a data link layer that receives said TS data packets, wherein said data link comprises:
      a TS demultiplexer that corrects said IP datagrams and stores the corrected IP datagrams;
      a Multi Protocol Encapsulation-Forward Error Correction (MPE-FEC) random access memory (RAM) unit operatively connected to said TS demultiplexer;
      a Reed-Solomon decoder operatively connected to said MPE-FEC RAM unit; and
      an IP to TS encapsulator operatively connected to said MPE-FEC RAM unit, wherein said IP to TS encapsulator converts said corrected IP datagrams to DVB-H TS data packets;
   a TS multiplexer operatively connected to each of said PID filter and said IP to TS encapsulator, wherein said TS multiplexer:
      receives said DVB-H TS data packets comprising said corrected IP datagrams corrected by said Reed-Solomon decoder; and
      combines both DVB-Terrestrial (DVB-T) and DVB-H TS data packets into a single combined TS data packet; and
   a host interface operatively connected to said TS multiplexer.

8. The DVB-H receiver of claim 7, wherein said TS demultiplexer extracts said IP datagrams from said TS packets.

9. The DVB-H receiver of claim 8, wherein said MPE-FEC RAM unit collects the extracted IP datagrams.

10. The DVB-H receiver of claim 9, wherein said RS decoder performs decoding on the collected IP datagrams in order to correct any transmission errors in said IP datagrams.

11. The DVB-H receiver of claim 7, further comprising a TS interface operatively connected between said TS multiplexer and said host interface.

12. The DVB-H receiver of claim 7, further comprising an IP interface operatively connected between said TS multiplexer and said host interface.

13. The DVB-H receiver of claim 7, wherein said host interface comprises any of a host IP interface and a host TS interface.

14. A method of transmitting data in a digital video broadcast handheld (DVB-H) receiver, said method comprising:
   extracting internet protocol (IP) datagrams from transport stream (TS) data packets;
   extracting said TS data packets based on a packet identifier (PID) of said TS data packets;
   decoding said IP datagrams in order to correct any transmission errors in said IP datagrams;
   converting the corrected IP datagrams to DVB-H TS data packets;
   combining both DVB-Terrestrial (DVB-T) and DVB-H TS data packets into a single combined TS data packet; and
   transmitting said single combined TS data packet to a host interface.

15. The method of claim 14, further comprising transmitting said single combined TS data packet through a TS interface prior to transmission to said host interface.

16. The method of claim 14, further comprising transmitting said single combined TS data packet through an IP interface prior to transmission to said host interface.

17. The method of claim 14, further comprising:
   dividing said IP datagrams into 184-byte packets;
   attaching a 4-byte header at the beginning of each said TS data packet to form a valid TS data packet;
   setting a payload unit start indicator bit equal to one for a first data packet and a last data packet of each data burst, wherein the number of IP bytes in said first data packet is 183 bytes;
   setting a fifth byte of said first data packet to 0x00;
   setting a fifth byte of said last packet to the number of remaining bytes of said data burst; and
   appending zeros to an end of said last packet when the number of the remaining bytes is less than 183.

18. The method of claim 17, wherein each header starts with a sync byte equaling 0x47 and comprises a PID equal to an original service PID.

19. The method of claim 14, further comprising:
   carrying an integer number of said TS data packets in each of said IP datagrams when said IP datagrams comprise Moving Picture Experts Group (MPEG) TS data packets; and
   removing IP/UDP/RTP headers from each said TS data packet before said TS packets are transmitted through to said host interface.

20. The method of claim 14, further comprising:
   removing IP/UDP/RTP headers from each said TS data packet when an IP datagram payload is non-MPEG formatted;
   dividing said IP datagram payload into 184-byte data packets comprising a 4-byte header attached thereto; and
   transmitting formed TS data packets through to said host interface.

* * * * *